United States Patent
Smith et al.

(10) Patent No.: US 9,400,622 B2
(45) Date of Patent: Jul. 26, 2016

(54) PATH INDEPENDENT PRINT QUEUES

(75) Inventors: Kenneth K. Smith, Boise, ID (US); David G. Butler, Eagle, ID (US); Andrew Alegria, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 13/537,108

(22) Filed: Jun. 29, 2012

(65) Prior Publication Data

US 2014/0002851 A1    Jan. 2, 2014

(51) Int. Cl.
*G06K 15/02* (2006.01)
*G06F 3/12* (2006.01)

(52) U.S. Cl.
CPC ............ *G06F 3/1204* (2013.01); *G06F 3/1236* (2013.01); *G06F 3/1284* (2013.01); *G06F 3/1285* (2013.01); *G06F 3/1292* (2013.01); *G06F 3/121* (2013.01); *G06F 3/126* (2013.01); *G06F 3/1271* (2013.01)

(58) Field of Classification Search
None
See application file for complete search history.

(56) References Cited

U.S. PATENT DOCUMENTS

| | | | |
|---|---|---|---|
| 5,703,929 A | 12/1997 | Schillaci et al. | |
| 5,966,658 A | 10/1999 | Kennedy, III et al. | |
| 6,700,674 B1 | 3/2004 | Otsuka et al. | |
| 6,721,286 B1 | 4/2004 | Williams et al. | |
| 6,842,460 B1 | 1/2005 | Olkkonen et al. | |
| 7,061,639 B2 | 6/2006 | McGuire et al. | |
| 7,062,651 B1 | 6/2006 | Lapstun et al. | |
| 7,072,067 B2 | 7/2006 | Leiman et al. | |
| 7,106,472 B2 | 9/2006 | Gomez et al. | |
| 7,187,462 B2 | 3/2007 | Oakeson et al. | |
| 7,196,803 B1 | 3/2007 | Simpson et al. | |
| 7,202,961 B2 | 4/2007 | Klosterman | |
| 7,224,913 B2 | 5/2007 | Richards | |
| 7,365,872 B2 | 4/2008 | Lawrence et al. | |
| 7,522,298 B2 | 4/2009 | Watts | |
| 7,522,855 B2 | 4/2009 | Nakamichi et al. | |
| 7,805,610 B2 | 9/2010 | Lapstun et al. | |
| 7,840,314 B2 | 11/2010 | Simon | |
| 7,861,182 B2 | 12/2010 | Liu | |
| 8,073,007 B2 | 12/2011 | Tremaine et al. | |
| 8,612,558 B2 | 12/2013 | Schmitz et al. | |
| 2004/0137919 A1 | 7/2004 | Biundo | |
| 2005/0122999 A1 | 6/2005 | Scherzer et al. | |
| 2005/0146744 A1 | 7/2005 | McAllister et al. | |
| 2006/0046712 A1 | 3/2006 | Shamp et al. | |

(Continued)

FOREIGN PATENT DOCUMENTS

| | | |
|---|---|---|
| GB | 2366052 | 2/2007 |
| JP | 2003318969 A | 11/2003 |

(Continued)

*Primary Examiner* — King Poon
*Assistant Examiner* — Andrew H Lam
(74) *Attorney, Agent, or Firm* — HP Inc. Patent Department

(57) ABSTRACT

In one embodiment, path data is received. The path data is indicative of a plurality of connectivity paths to electronically connect a computer and a printer. A graphic user interface is provided for display to a user, the interface to enable sending of print jobs to a print queue. The queue is to hold the print jobs to be sent to the printer, and is without limitation to a specific path among the plurality of paths. A command for the computer to send a first print job to the printer is received via the interface. The plurality of paths is monitored to identify an available path among the plurality of paths. The first print job is caused to be sent from the queue to the printer via the available path.

19 Claims, 5 Drawing Sheets

(56) References Cited

U.S. PATENT DOCUMENTS

| | | |
|---|---|---|
| 2006/0126620 A1 | 6/2006 | Bonar et al. |
| 2006/0135143 A1 | 6/2006 | Suematsu |
| 2006/0146353 A1* | 7/2006 | Yue .................... G06F 3/1205 358/1.13 |
| 2006/0200564 A1 | 9/2006 | Watanabe et al. |
| 2007/0100507 A1 | 5/2007 | Simon |
| 2008/0004075 A1 | 1/2008 | Horton |
| 2008/0246988 A1 | 10/2008 | Ashton |
| 2009/0046306 A1 | 2/2009 | Green |
| 2010/0027414 A1 | 2/2010 | Hamachi |
| 2010/0106864 A1 | 4/2010 | Li et al. |
| 2010/0124196 A1* | 5/2010 | Bonar ................ H04B 7/0689 370/329 |
| 2010/0150161 A1 | 6/2010 | Saksena et al. |
| 2010/0177711 A1 | 7/2010 | Gum |
| 2011/0019231 A1 | 1/2011 | Nakamura |
| 2011/0029692 A1 | 2/2011 | Chassot et al. |
| 2011/0255110 A1 | 10/2011 | d'Entrecasteaux |
| 2011/0261389 A1 | 10/2011 | Ohara |
| 2012/0257245 A1* | 10/2012 | McCoog ............. G06F 3/1204 358/1.15 |

FOREIGN PATENT DOCUMENTS

| | | |
|---|---|---|
| JP | 2004180225 A | 6/2004 |
| JP | 2010074375 A | 4/2010 |
| WO | WO-2009025237 A1 | 2/2009 |

* cited by examiner

PATH INDEPENDENT PRINT QUEUES

BACKGROUND

A user of a notebook computer, smartphone, or other computing device may send a print job to a printer for printing. The print job may include a document, image, or other content that is identified for printing via user interaction with an operating system, or a web browser or other application executing at the computer. Upon receipt of a user's instruction to print the content, the operating system or application typically provides a printer selection graphic user interface for display to the user.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Figure 1:
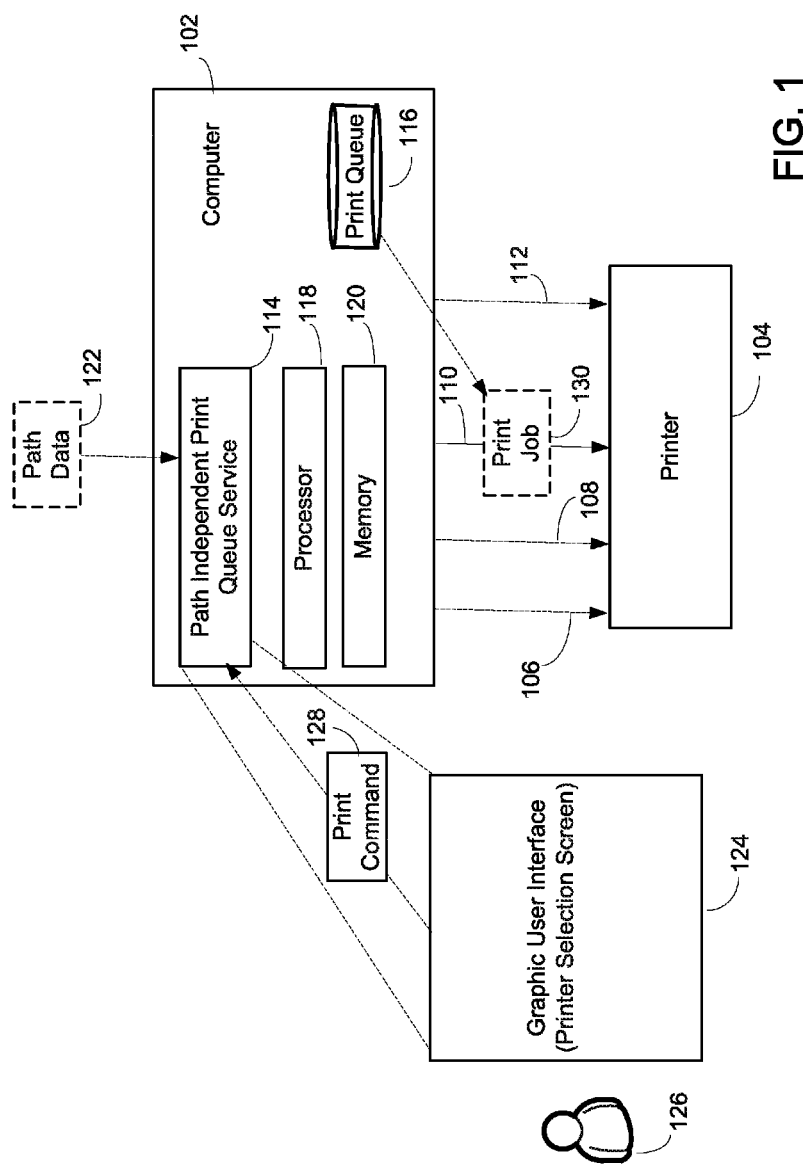
FIG. 1 is a block diagram illustrating a system according to various embodiments.

A printer selection graphic user interface (also sometimes referred to herein as a "printer selection GUI") presented to a user at a host computing device typically offers the user the opportunity to send a print job to a set of printers known to the host computing device. The printer selection GUI may be in the form of a print dialog window or a printer selection screen. In a common example, each printer icon displayed represents a specific printer, and a specific connectivity path to that printer. As each printer icon represents a single printer/path combination, experienced users may find this architecture useful for troubleshooting and other system level purposes.

However, a drawback associated with this architecture is that if a particular printer is actually accessible via multiple connectivity paths, multiple incidences of the printer are displayed at the printer selection GUI—e.g., one incidence of the printer for each connectivity path. For example if a user desires to send a print job from the host computer to a "ABC Office A1234" printer, the user may encounter a print selection screen displaying printer available for selections and print queues including "ABC Office A1234 ((cay22q5491.pro.abc.com)", ABC Office A1234 (USB connection), ABC Office A1234 (home wireless), and ABC Office A1234 (office network). In this example, these multiple incidences of the ABC Office A1234 may be listed with a number of other printers, and some of these other printers may themselves be listed multiple times due to their being accessible via multiple paths.

A user, e.g., a user that is new to, or seldom encounters such a printer selection interface, may be confused by the multiple listings of the same printer, and choose a listing representing a path that is not available at that time. Even if the user is experienced, it is possible that what is thought to be an operating path is actually inoperable because of a loose cable connection, a power down at a home or office router, or a loss of internet connectivity, etc. Typically, if a chosen printer/path combination is unavailable at the time of the sending of the print job via the printer selection GUI, or if such printer/path combination becomes unavailable prior sending of the print job to the printer, the job remains in the print queue until the connectivity path is reestablished. This may be unacceptable to users in certain situations, e.g., if the print job is urgently needed or the user has limited familiarity with print queues. Furthermore, if the user prints the job via at an alternative printer, or via the same printer with a different connectivity path, it is common that the user will not take the step of deleting the print job from the initial print queue. There will likely be a supplies cost and user annoyance when the first-selected path becomes available and the print job that remains in the print queue prints for a second time. Such situations can cause user dissatisfaction with the host computer, the printer, or both.

Accordingly, various embodiments described herein were developed to provide for display to a user, a graphic user interface to enable sending of print jobs to a print queue, wherein the print queue is to hold the print jobs to be sent to the printer, without limitation to a specific connectivity path. In an example of the disclosure, a path independent print queue service ("PIPQ service") that is executed at a computer receives path data. The path data is data indicative of a plurality of connectivity paths to electronically connect the computer and a printer. The PIPQ service provides, for display to a user, a graphic user interface to enable sending of print jobs to a print queue, wherein the print queue is to hold the print jobs to be sent to the printer, and is not limited to a specific path among the plurality of paths. The PIPQ service receives, via the interface, a command for the computer to send a first print job to the printer. The PIPQ service monitors the plurality of paths to identify an available path among the plurality of paths, and then cause sending of the first print job from the print queue to the printer via the identified available path.

As used in this application, a "connectivity path" refers to a route or course that a print job travels from a host computer to a printer. In examples, a connectivity path may include one or more of a cable, wireless, fiber optic, or remote connection via a telecommunication link, an infrared link, a radio frequency link, or some combination of these, or any other connectors or systems that provide electronic communication. In examples, a connectivity path may be a path within a network or across multiple networks. A "host computer" refers to a computing device that sends a print job to a printer by way of a network or other connectivity path. A "printer" or "printing device" refers to any thermal ink transfer printer, piezo ink transfer printer, dry toner-based printer, liquid toner-based printer, or any other electronic device that prints. "Printer" or "printing device" includes any multifunctional electronic device that performs a function such as scanning and/or copying in addition to printing. A "print job" refers to instructions and/car content for printing that can be stored in a programming language and/or numerical form so that it can stored and used in computing devices, servers, printers and other machines capable of performing calculations and manipulating data, A "print queue" refers to a memory location to hold print jobs designated for a printer until the printer receives the print job. "Polling" of available connectivity paths refers to a computer (e.g., a host computer or a printer)

performing an inventory of paths that that have been previously used and/or are available to send print jobs from the host computer.

FIG. 1 shows a computer 102 electronically connectable to a printer 104 via a first connectivity path 106, a second connectivity path 108, a third connectivity path 110, and a fourth connectivity path 112. Computer 102 represents generally any computing device or group of computing devices configured to send and receive network requests, send and receive data, and/or otherwise communicate with, the printer 104 via the first, second, third, and fourth connectivity paths 106 108 110 112. In examples, computer 102 may be or include a server, desktop computer, notebook computer, mobile device, tablet computer, and/or any other computing device.

Printer 104 represents generally any computing device or group of computing devices operable to produce a printed print job or printed content, and additionally operable to send and receive internet requests, receive printable content and print jobs, and otherwise communicate with the computer 102. Each of connectivity paths 106 108 110 and 112 represents generally hardware components and computers interconnected by communications channels that allow sharing of resources and information. A connectivity path may include, at least in part, an intranet, the internet, or a combination of both. A connectivity path may also include intermediate proxies, routers, switches, load balancers, and the like. The distinct connectivity paths 106 108 110 and 112 as depicted in FIG. 1 represent the logical communication paths between these devices, not necessarily the physical paths between the devices. In an example, the distinct connectivity paths between the computer 102 and the printer 104 represented by paths 106, 108, 110 and 112 may include a connectivity path via a USB connection, a connectivity path via a wired network, a connectivity path via a wireless network, and a connectivity path via an internet.

Computer 102 is shown to include PIPQ service 114, a print queue 116, a processor 118, and a memory 120. PIPQ service 114 represents generally any combination of hardware and programming configured to provide, for display to a user, a graphic user interface to enable sending of print jobs to a path-independent print queue. Print queue 116 represents generally a memory or memories to hold print jobs to be sent to a specified printer, without limitation to a particular or specified connectivity path from the computing device to the printer. Processor 114 represents generally any instruction execution system, such as a computer/processor based system or an ASIC (Application Specific Integrated Circuit), a computer, or other system that can fetch or obtain instructions or logic stored in memory 120 and execute the instructions or logic contained therein. Memory 120 represents generally any memory configured to store program instructions and other data.

In the example of FIG. 1, the PIPQ service 114 receives path data 122 indicative of a plurality of connectivity paths 106 108 110 112 to electronically connect the computer 102 and the printer. In an example, the path data 122 may be data generated via a polling of available paths conducted by a path polling service that is executed at computer 122. In another example, the path data 122 may be data generated via a polling of available paths conducted by the printer, and is received by the PIPQ service 114 from the printer. In another example, the path data 122 may be data generated via input by a user 126 at the computer 102, e.g., via an administrator application or system setup application configured to receive administrator user input regarding available connectivity paths between the computer 102 and the printer 104. In another example in which the printer has a interface such as a touchscreen or keypad, a user may submit user input regarding available connectivity paths between the computer 102 and the printer 104 at the printer itself 104. In another example, a user interacting with an interface at the printer 104, e.g., a button, switch, touchscreen or any other interface, causes a web browser page that controls the printer to generate the path data 122. In an example, the web browser page is a printer control page served by an embedded web server executing at the printer 104. In yet another example, user interaction with an interface at the printer 104 initiates a printer set up procedure, and the set up procedure includes causing a printer control page executing at the printer 104 to generate the path data 122.

After identification of the plurality of connectivity paths 106 108 110 112 for connecting the computer 102 and the printer 104, the PIPQ service provides a graphic user interface 124 for display to a user 126. The graphic user interface 124 is to enable sending of print jobs to a print queue 116 in connection with receipt of a user directive via the interface 124. The print queue 116 is a queue to hold the print jobs to be sent to the printer 104, and is a queue without limitation to a specific path among the plurality of paths. In other words, print queue 116 is configured to hold any print job set to printer 104 via any of the plurality of connectivity paths 106 108 110 112, and is not specific to an particular path.

In the example of FIG. 1, the user 126 sends a print command 128 via with the graphic user interface 124, and the print command 128 is received by the PIPQ service 114. The print command 128 is a command to the computer 102 to send a first print job 130 to the printer 104. In an example, the user's 126 interaction with the graphic user interface 124 may be via user manipulation of an interface device such as a touchscreen, mouse, keyboard, or voice recognition system at the computer 102. In another example, a user's interaction with the graphic user interface 124 may be via a touchpad, keypad, or other interface device at a second computing device in electronic communication with the computer 102 (e.g., a smartphone or other mobile device). The PIPQ service 114 monitors the plurality of paths 106 108 110 112 to identify an available path 110. After receipt of the print command 128 and identification of an available path 126, the PIPQ service 114 causes the computer 102 to send the first print job 130 from the print queue 116 to the printer 104 via the available path 110.

The functions and operations described with respect to PIPQ service 114 and computer 102 may be implemented as a non-transitory computer-readable storage medium containing instructions executed by a processor (e.g., processor 118) and stored in a memory (e.g., memory 120). In a given implementation, processor 118 may represent multiple processors, and memory 120 may represent multiple memories. Processor 118 represents generally any instruction execution system, such as a computer/processor based system or an ASIC (Application Specific Integrated Circuit), a computer, or other system that can fetch or obtain instructions or logic stored in memory 120 and execute the instructions or logic contained therein. Memory 120 represents generally any memory configured to store program instructions and other data.

Figure 2:
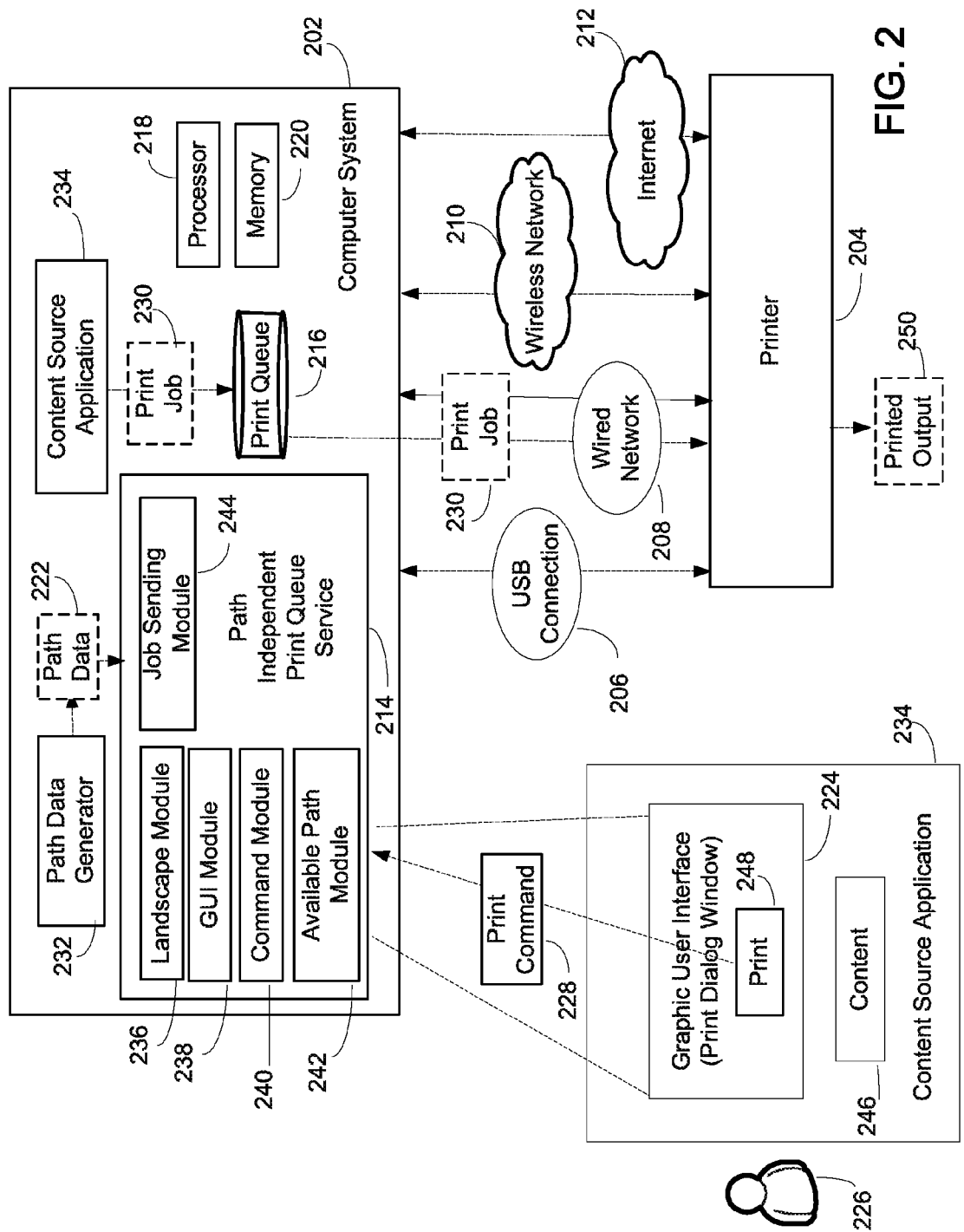
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a computer system 202 electronically connectable to a printer 204 via USB connection connectivity path 206, a wired network connectivity path 208, a wireless network connectivity path 210, and an internet connectivity path 212. Computer system 202 represents generally any computing device or group of computing devices configured to send and receive network requests, send and receive data, and/or otherwise communicate with, the printer 204 via the USB, wired network, wireless network, and internet connectivity paths 206 208 210 212. In examples, computer system 202 may be or include a server, desktop computer, notebook computer, mobile device, tablet computer, and/or any other computing device.

Printer 204 represents generally any computing device or group of computing devices operable to produce a printed print job or printed content, and additionally operable to send and receive internet requests, receive printable content and print jobs, and otherwise communicate with the computer system 202.

Each of connectivity paths 206 208 210 and 212 represents generally hardware components and computers interconnected by communications channels that allow sharing of resources and information. Any of the wired network, wireless network, or internet connectivity paths 208 210 212 may include, at least in part, an intranet, the internet, or a combination of both. Any of the wired network, wireless network, or internet connectivity paths 208 210 212 may also include intermediate proxies, routers, switches, bad balancers, and the like. The distinct USB, wired network, wireless network, and internet connectivity paths 206 208 210 212 as depicted in FIG. 2 represent the logical communication paths between these devices, not necessarily the physical paths between the devices. In one example of a wired network 208, the computer 202 and the print 204 each are connected to a wired infrastructure network via LAN networking, including network cables and a hardwired access point. In one example of a wireless network 208, the computer 202 and the print 204 each are connected to a wireless network via WLAN networking, including a wireless access point that allows wireless devices to connect to a LAN network using Wi-Fi, Bluetooth, infrared, or related standards. In another example of a wireless network 208, there is a direct wireless connection or ad hoc network between the computer and the printer.

Computer system 202 is shown to include a PIPQ service 214, a print queue 216, a path data generator 232, a content source application 234, a processor 218, and a memory 220. PIPQ service 214 represents generally any combination of hardware and programming configured to provide, for display to a user, a graphic user interface to enable a use to identify a printer and send a print job to the printer via a path-independent print queue. The PIPQ service 214 includes a landscape module 236, a graphic user interface module 238, a command module 240, an available path module 242, and a job sending module 244.

Print queue 216 represents generally a memory or storage location to hold print jobs to be sent to a specified printer, without limitation to a particular or specified connectivity path from the computing device to the printer. Path data generator 232 represents generally a service or module to generate path data indicative of a plurality of connectivity paths to electronically connect the computer system 202 and the printer. Content source application 234 represents generally a web browser, a word processing or imaging application, or any other computer application from which content can be identified and sent for printing as a print job. Processor 214 represents generally any instruction execution system, such as a computer/processor based system or an ASIC (Application Specific Integrated Circuit), a computer, or other system that can fetch or obtain instructions or logic stored in memory 220 and execute the instructions or logic contained therein. Memory 220 represents generally any memory configured to store program instructions and other data.

In the example of FIG. 2, the path data generator 232 within the computer system 202 produces a list or record of connectivity paths to connect the computer system 202 with the printer 204. In an example, the path data generator 232 at computer system 202 may create the path data 222 by conducting an electronic polling of available paths. In an example, polling may include performing an inventory of connectivity paths that that are available at the time of the inventory. In another example, polling may include performing an inventory of connectivity paths that that are available at the time of sending of the print request. In another example, polling may include performing an inventory of connectivity paths that that are expected to be available at a targeted time for printing. In another example, the printer 204 may include and execute a path data generator, such that the polling of available paths is conducted by the printer.

Continuing with the example of FIG. 2, after the landscape module 236 receives the path data 222 from the path data generator 232, the graphic user interface module 238 provides a graphic user interface 224 for display to a user 226. In this example the graphic user interface 224 is in the form of a "print dialog window" to enable a user, via interaction with the interface 224 to send print jobs to the printer 204 via to print queue 216. In another example, the graphic user interface 224 may indicate the status, health, or other attributes print jobs held in the print queue.

The print queue 216 is a queue to hold the print jobs to be sent to the printer 204 and is without limitation to a specific path among the plurality of paths 206 208 210 212. In the example of FIG. 2, the print queue 216 is a location in memory within the computer system 202. In another example, the print queue 216 may be located in a memory within a third computer separate from the second computer system 202 and the printer 204. For example, in large printing environments, the print queue may be maintained at a centralized print server.

Continuing with the example of FIG. 2, the user 226 views the content 246 made available to the user 226 by a content source application 234 executing at computer system 202. In an example, the content is displayed to the user 226 via a monitor, touchscreen, or other display device at computer system 202, or at a mobile device or other second computing device electronically connected to the computer system 202. In one example, the content source application 234 is a web browser and the content 246 is web content. In another example, the content source application 234 is a word processing application and the content is text and pictorial content.

The user 226, via a user interface device such as a mouse, keyboard, or touchpad, identifies certain content within the content source application 234 for printing at printer 204. The user 226, by interacting with a "Print" button 248 included within the graphic user interface 224, initiates a print command 228 that creates a first print job 230 that includes the content 246.

The command module 240 receives the print command 228 that is sent via the graphic user interface 224 and instructs the computer system 202 to send the first print job 230 to the printer 204. The available path module 242 monitors the plurality of paths 206 208 210 212 to identify the wired network connectivity path 208 an available path. After identification of the wired network 208 as an available path, the job sending module 244 causes the computer system 202 to send the first print job 230 from the print queue 216 to the printer 204 via the available wired network path 210. The printer 204 in turn prints the first print job 230 to create printed output 250.

The functions and operations described with respect to PIPQ service 214 and computer system 202 may be implemented as a non-transitory computer-readable storage medium containing instructions executed by a processor (e.g., processor 218) and stored in a memory (e.g., memory 220). In a given implementation, processor 218 may represent multiple processors, and memory 220 may represent multiple memories. Processor 218 represents generally any instruction execution system, such as a computer/processor based system or an ASIC (Application Specific Integrated Circuit), a computer, or other system that can fetch or obtain instructions or logic stored in memory 220 and execute the instructions or logic contained therein. Memory 220 represents generally any memory configured to store program instructions and other data.

Figure 3:
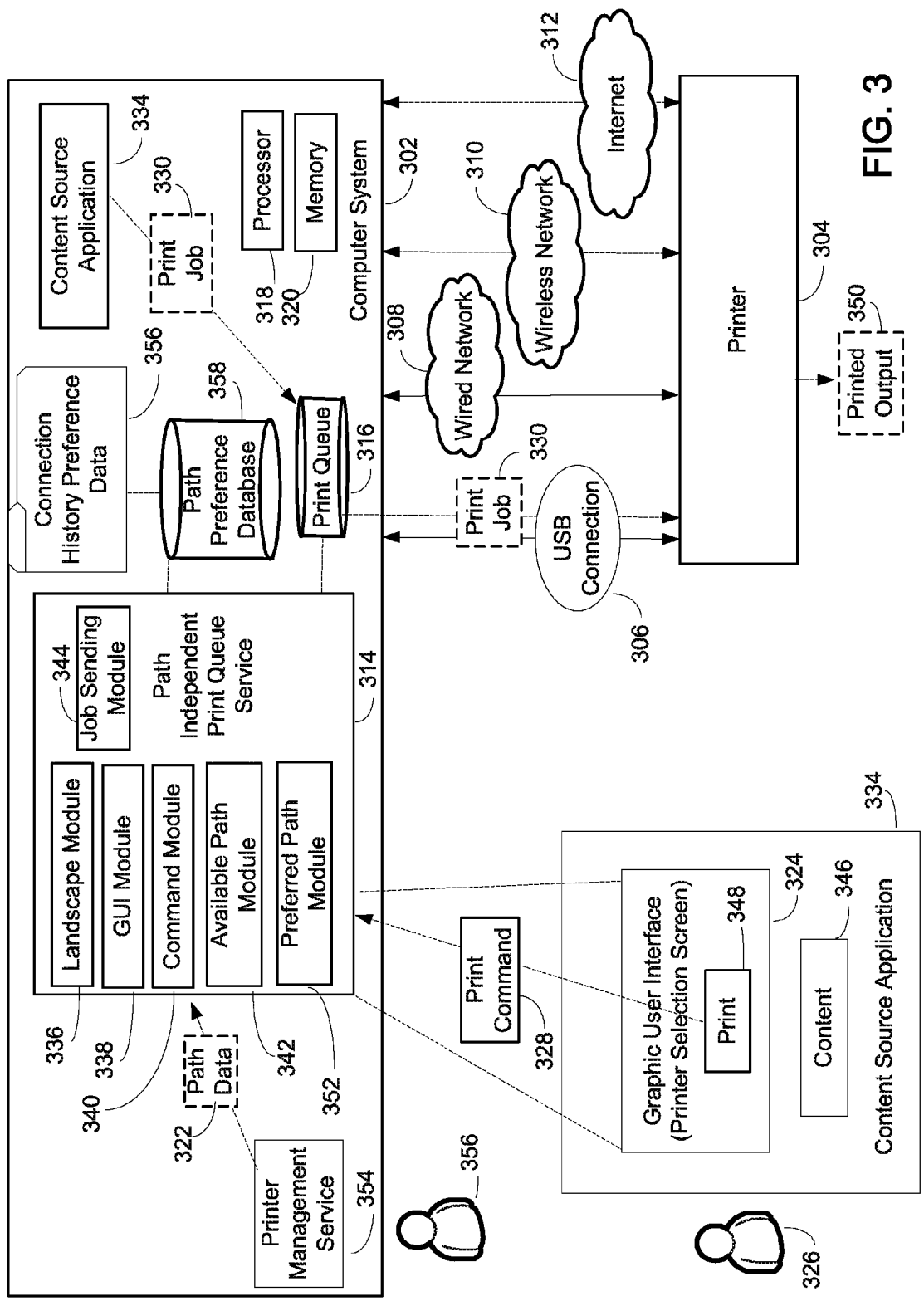
FIG. 3 is a block diagram illustrating a system according to various embodiments.

FIG. 3 is a block diagram illustrating a system according to various embodiments. FIG. 3 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 3 shows a computer system 302 electronically connectable to a printer 304 via USB connection connectivity path 306, a wired network connectivity path 308, a wireless network connectivity path 310, and an internet connectivity path 312. Computer system 302 represents generally any computing device or group of computing devices configured to send and receive network requests, send and receive data, and/or otherwise communicate with, the printer 304 via the USB, wired network, wireless network, and internet connectivity paths 306 308 310 312. In examples, computer system 302 may be or include a server, desktop computer, notebook computer, mobile device, tablet computer, and/or any other computing device.

Printer 304 represents generally any computing device or group of computing devices operable to produce a printed print job or printed content, and additionally operable to send and receive internet requests, receive printable content and print jobs, and otherwise communicate with the computer system 302.

Each of connectivity paths 306 308 310 and 312 represents generally hardware components and computers interconnected by communications channels that allow sharing of resources and information. The USB, wired network, wireless network, and internet connectivity paths 306 308 310 312 as depicted in FIG. 3 represent the logical communication paths between these devices, not necessarily the physical paths between the devices.

Computer system 302 is shown to include a PIPQ service 314, a print queue 316, a printer management service 354, a path preference database 358, a content source application 334, a processor 318, and a memory 320. PIPQ service 314 represents generally any combination of hardware and programming configured to provide, for display to a user, a graphic user interface to enable a use to identify a printer and send a print job to the printer via a path-independent print queue. The PIPQ service 314 includes a landscape module 336, a graphic user interface module 338, a command module 340, an available path module 342, a preferred path module 352, and a job sending module 344.

Print queue 316 represents generally a memory or storage location to hold print jobs to be sent to a specified printer, without limitation to a particular or specified connectivity path from the computing device to the printer. Printer management service 354 represents generally a service or module to enable a user to provide path data to the PIPQ service 314. Path preference database 358 represents generally a database, registry, lookup table or list that holds preference data that can be utilized to determine or select a preferred available path between the computer system 302 and the printer 304. Content source application 334 represents generally a web browser, a word processing or imaging application, or any other computer application from which content can be identified and sent for printing as a print job. Processor 314 represents generally any instruction execution system, such as a computer/processor based system or an ASIC (Application Specific Integrated Circuit), a computer, or other system that can fetch or obtain instructions or logic stored in memory 320 and execute the instructions or logic contained therein. Memory 320 represents generally any memory configured to store program instructions and other data.

In the example of FIG. 3, a printer management service 354 executing at the computer system 302 receives from a user, e.g., an administrator user 356, path data 322 including a list or record of connectivity paths to connect the computer system 302 with the printer 304. In another example, the path data 322 may be received from the administrator user 356 via user input at a computing device that is separate from, but electronically connected to, the computer system 302.

The landscape module 336 that executes at PIPQ service 314 at the computing device 302 receives the user-supplied path data 322 from the printer management service 354. In turn, the graphic user interface module 338 provides a graphic user interface 324 for display to a user 326. In this example the graphic user interface 324 is in the form of a "printer selection screen" to enable a user, via interaction with the interface 324 to send print jobs to the printer 304 via to print queue 316. The print queue 316 is a queue to hold the print jobs to be sent to the printer 304, and is without limitation to a specific path among the plurality of paths 306 308 310 312.

Continuing with the example of FIG. 3, the user 326 views the content 346 made available to the user 326 by a content source application 334 executing at computer system 302. In an example, the content is displayed to the user 326 via a monitor, touchscreen, or other display device at computer system 302, or at a mobile device or other second computing device electronically connected to the computer system 302. The user 326, via a user interface device such as a mouse, keyboard, or touchpad, identifies particular content provided by the content source application 334 for printing at printer 304. The user 326, by interacting with a "Print" button 348 included within the graphic user interface 324, initiates a print command 328 that creates a first print job 330 that includes the content 346.

The command module 340 receives the print command 328 that is sent via the graphic user interface 324 and instructs the computer system 302 to send the first print job 330 to the printer 304. The available path module 342 monitors the plurality of paths 306 308 310 312 to identify a set of available connectivity path 308 as available paths. In this example, the available path module 342 identifies each of the USB connection path 306, the wired connection paths 308, the wireless connection path 310, and the internet path 312 as members of the set of available connectivity paths.

In the example of FIG. 3, after the available path module 342 identifies the set of available paths, the preferred path module 352 designates, from the set, a preferred available path according to preference data. In the example of FIG. 3, the USB connection path 306 is identified as the preferred available path in accordance with "connection history" preference data 356 stored at a path preference database 358 at computer system 302. The connection history preference data includes a preference instruction, a preference formula, a preference algorithm, or a preference ranking that the preferred path module 352 utilizes in determining a preferred available path among the set of available paths.

In one example, the preference data 356 includes a preference instruction, a preference formula, a preference algorithm, or a preference ranking based upon projected times to printing for each of the available paths within the set. In an example, the projected time printing ranking is created at least in part based upon historical data of times to print for the paths within the available set. The preferred available path is designated in consideration of the projected times to printing.

In another example, the preference data 356 includes a preference instruction, a preference formula, a preference algorithm, or a preference ranking based upon a security ranking for each of the available paths within the set. The preferred available path is designated in consideration of the security rankings. In a particular example in which the preferred available path is designated in consideration of the security rankings, the print job is encrypted prior to being sent from the print queue 316 to the printer. In another example, the preference data 356 includes a preference instruction, a preference formula, a preference algorithm, or a preference ranking based upon a reliability ranking for each of the available paths within the set. In an example, the reliability ranking is created at least in part based upon a database or folder describing successful connections and/or unsuccessful connection attempts. The preferred available path is designated in consideration of the reliability rankings.

In yet another example, the preference data 356 includes a preference instruction, a preference formula, a preference algorithm, or a preference ranking based upon a data transmission cost for each of the available paths within the set. For example, the preference data 356 may indicate a preference for the USB connection 306 and the wired network 308 over the wireless network connectivity path 310 and the internet connectivity path 310 due to cellular airtime or other access charges associated with the wireless and the internet connectivity networks 310 312. Similarly, the USB connection connectivity path 306 may be deemed preferable over the wired network 308 connectivity path 308 due to service charges associated with maintaining the wired network. The preferred path module 352 designates the preferred available path in consideration of the projected data transmission cost.

In the example of FIG. 3, after the preferred path module 352 identifies the USB connection connectivity path 306 as the preferred available path, the job sending module 344 causes the computer system 302 to send the first print job 330 from the print queue 316 to the printer 304 via the preferred available USB connection connectivity path 306. The printer 304 in turn prints the first print job 330 to create printed output 350.

The functions and operations described with respect to PIPQ service 314 and computer system 302 may be implemented as a non-transitory computer-readable storage medium containing instructions executed by a processor (e.g., processor 318) and stored in a memory (e.g., memory 320). In a given implementation, processor 318 may represent multiple processors, and memory 320 may represent multiple memories. Processor 318 represents generally any instruction execution system, such as a computer/processor based system or an ASIC (Application Specific Integrated Circuit), a computer, or other system that can fetch or obtain instructions or logic stored in memory 320 and execute the instructions or logic contained therein. Memory 320 represents generally any memory configured to store program instructions and other data.

Figure 4:
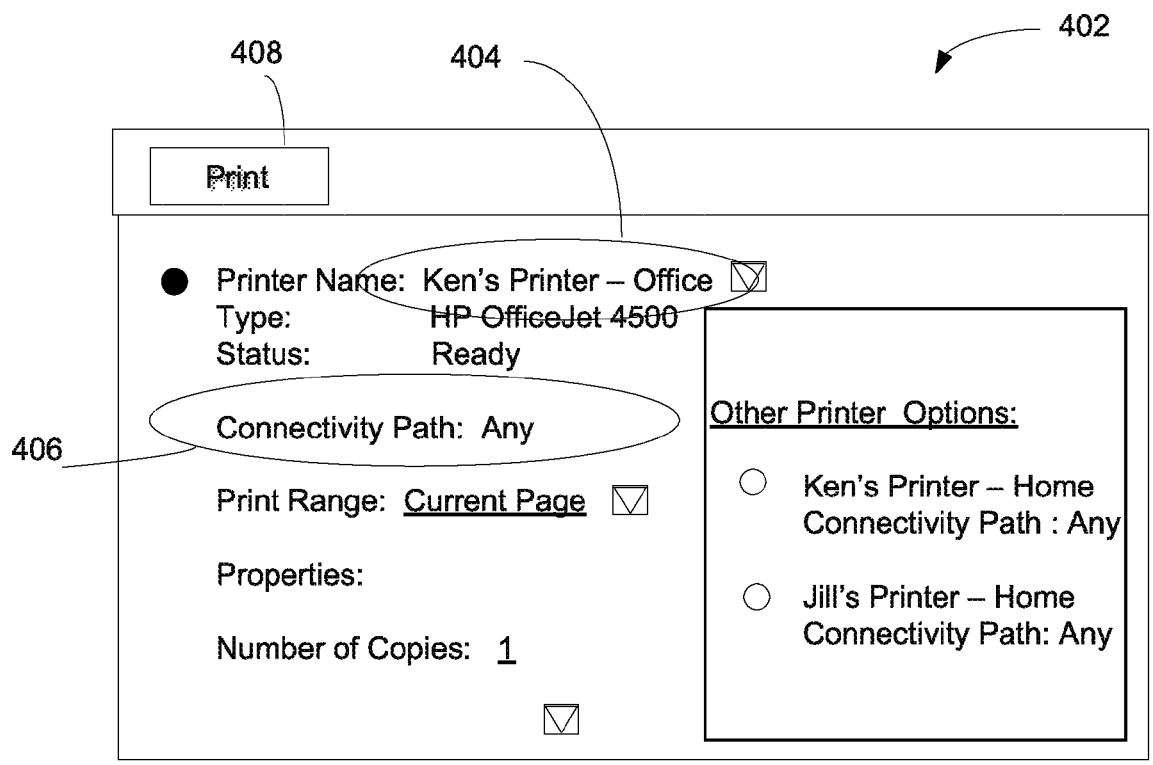
FIG. 4 is a screen shot depicting an example of a printer selection graphic user interface, according to various embodiments.

FIG. 4 is a screen shot depicting an example of a printer selection graphic user interface, according to various embodiments. In an example, a PIPQ service, after receipt of path data indicative of a plurality of connectivity paths to electronically connect a host computer to a printer 404 designated as "Ken's Printer—Office", provides a graphic user interface 402 for display to a user. The graphic user interface 402 is to enable sending of print jobs to a print queue, wherein the queue is to hold the print jobs to be sent to the printer 404, and the print queue is without limitation 406 to a specific path among the plurality of paths.

In this example, upon a user's selection of the "Ken's Printer-Office" 404 printer and interaction with the "Print" button 408 included within the display, a print command is sent to the PIPQ service. The command is for the host computer to send the print job to the printer. Responsive to receipt of the print command, the PIPQ service monitors a plurality of connectivity paths to the printer to identify an available path among the plurality of paths. Upon identification of an available path, the PIPQ service causes the first print job to be sent from the print queue to the printer via the available path.

Figure 5:
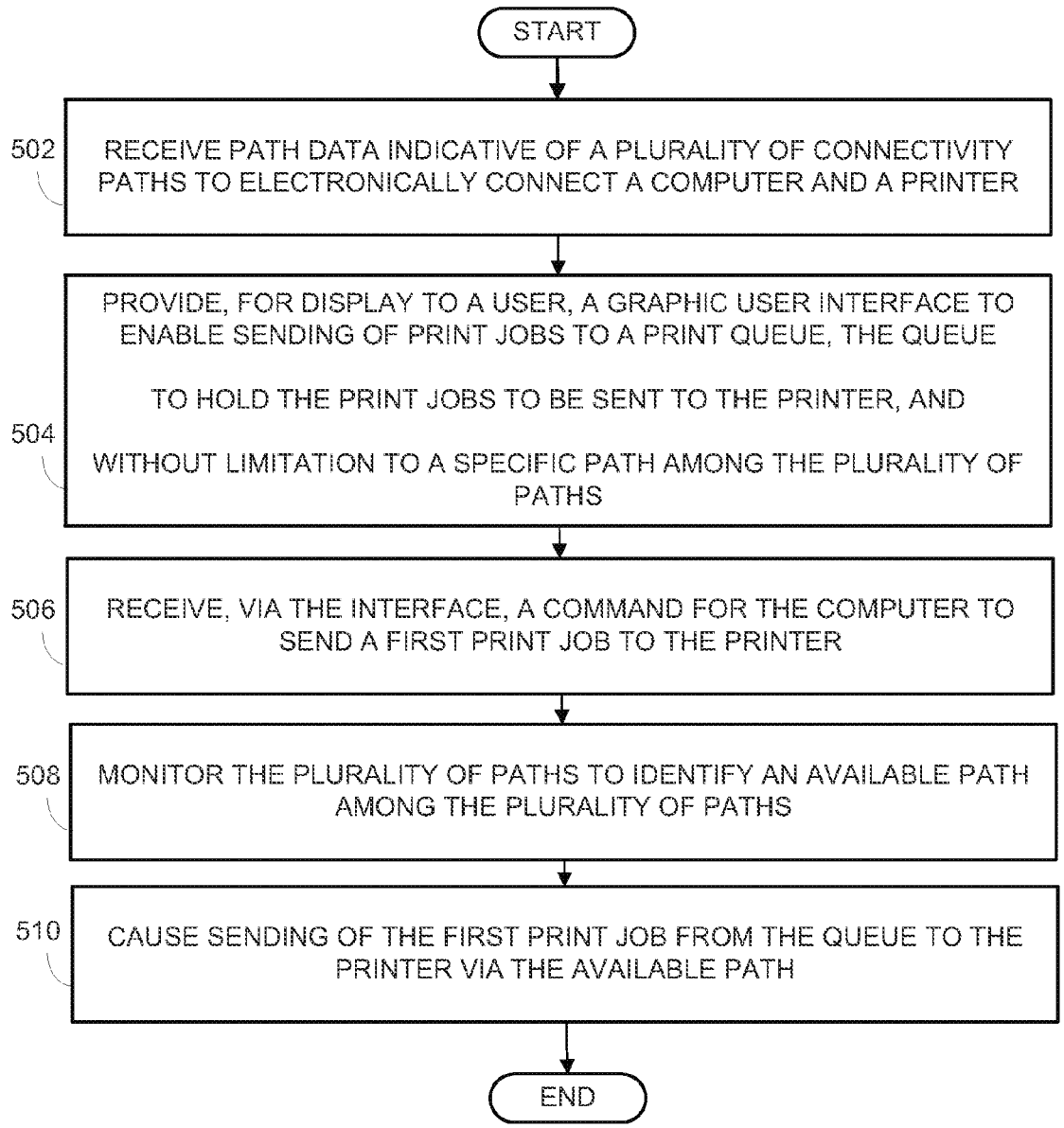
FIG. 5 a flow diagram depicting steps taken to implement various embodiments.

FIG. 5 is a flow diagram of operation in a system according to various embodiments. In discussing FIG. 5, reference may be made to the diagrams of FIGS. 2, 3 and 4 to provide contextual examples. Implementation, however, is not limited to those examples. Starting with FIG. 5, path data is received. The path data is indicative of a plurality of connectivity paths to electronically connect a computer and a printer (block 502). Referring back to FIGS. 2, 3 and 4, the landscape module 236 336 436 may be responsible for implementing block 502.

Continuing with FIG. 5, a graphic user interface is provided, the interface for display to a user to enable sending of print jobs to a print queue. The print queue is to hold the print jobs to be sent to the printer, and is without limitation to a specific path among the plurality of paths (block 504). Referring back to FIGS. 2, 3 and 4, the graphic use interface module 238 338 438 may be responsible for implementing block 504.

Continuing with FIG. 5, a command for the computer to send a first print job to the printer is received via the interface (block 506). Referring back to FIGS. 2, 3 and 4, the command module 240 340 440 may be responsible for implementing block 506.

Continuing with FIG. 5, the plurality of paths is monitored to identify an available path among the plurality of paths (block 508). Referring back to FIGS. 2, 3 and 4, the available path module 242 342 442 may be responsible for implementing block 508.

Continuing with FIG. 5, the first print job is caused to be sent from the print queue to the printer via the available path (block 510). Referring back to FIGS. 2, 3 and 4, the job sending module 244 344 444 may be responsible for implementing block 510.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions to provide a path independent print queue, the instructions when executed by a processor causing the processor to:
receive path data indicative of a plurality of connectivity paths to electronically connect a computer and a printer, wherein the path data is data generated via a polling of available paths conducted by the printer;
provide, for display to a user, a graphic user interface to enable sending of print jobs to a print queue, the print queue
to hold the print jobs to be sent to the printer, and
without limitation to a specific path among the plurality of paths;
receive, via the interface, a command for the computer to send a first print job to the printer;
monitor the plurality of paths to identify an available path among the plurality of paths;
select a preferred connectivity path from among the plurality of connectivity paths based on a preference ranking; and
cause sending of the first print job from the print queue to the printer via the preferred connectivity path.

2. The medium of claim 1,
wherein a set of available paths are identified;
wherein the instructions cause the processor to designate, from the set, a preferred available path according to preference data; and
wherein the lint print job is sent from the print queue to the printer via the preferred available path.

3. The medium of claim 2, wherein the preference data includes a preference instruction, a preference formula, a preference algorithm, or a preference ranking.

4. The medium of claim 2, wherein the preference data includes a projected time to printing for each of the available paths within the set, and the preferred available path is designated in consideration of the projected times to printing.

5. The medium of claim 2, wherein the preference data includes a security ranking for each of the available paths within the set, and the preferred available path is designated in consideration of the security rankings.

6. The medium of claim 5, wherein the first print job is encrypted prior to being sent from the queue to the printer.

7. The medium of claim 2, wherein the preference data includes a data transmission cost for each of the available paths within the set, and the preferred available path is designated in consideration of the projected data transmission cost.

8. The medium of claim 2, wherein the preference data includes a reliability ranking for each of the available paths within the set, and the preferred available path is designated in consideration of the reliability rankings.

9. The medium of claim 1, wherein the path data further comprises data generated via a polling of available paths conducted by the computer.

10. The medium of claim 9, wherein the polling comprises performing an inventory of connectivity paths that are available at the time of sending of a print request.

11. The medium of claim 1, wherein the path data further comprises data generated via user input at the computer.

12. The medium of claim 11, wherein the plurality of connectivity paths include a wired path and a wireless path.

13. The medium of claim 11, wherein the plurality of connectivity paths includes a direct wireless connection between the computer and the printer.

14. The medium of claim 1, wherein the path data further comprises data generated via user input at the printer.

15. A system to enable a path independent print queue, comprising:
a memory; and
a processor to execute instructions stored in the memory to implement modules, the modules comprising:
a landscape module to receive path data indicative of a plurality of connectivity paths to electronically connect a computer and a printer, wherein the path data is data generated via a polling of available paths conducted by the printer;
a graphic user interface module to provide, for display to a user, a graphic user interface to enable sending of print jobs to a print queue;
a command module to receive, via the interface, a command for the computer to send a first print job to the printer;
an available path module to monitor the plurality of paths to identify a set of available paths from among the plurality of paths;
a preferred path module to designate, from the set of available paths, a preferred available path based on connection history preference data located in a path preference database; and
a job sending module to cause sending of the first print job front the print queue to the printer via the preferred available path; and
the print queue to hold the print jobs to be sent to the printer without limitation to a particular path among the plurality of paths.

16. The system of claim 15,
wherein the available path module identifies a set of available paths;
further comprising a preferred path module to cause the processor to designate, from the set, a preferred available path according to preference data; and
wherein the job sending module sends the first print job from the print queue to the printer via the preferred available path.

17. The system of claim 16, wherein the preference data includes a projected time to printing for each of the available paths within the set, and the preferred available path is designated in consideration of the projected times to printing.

18. The system of claim 15, wherein the path data is data generated via user input at the computer or the printer.

19. A non-transitory computer-readable storage medium containing instructions to provide a path independent print queue, the instructions when executed by a processor causing the processor to:
receive path data indicative of a plurality of connectivity paths to electronically connect a computer and a printer, wherein the path data is generated via polling of available paths conducted by the printer, and wherein the plurality of connectivity paths include a wired path and a wireless path;
provide, for display to a user, a graphic user interface to enable sending of print jobs to a print queue, the print queue to hold any print jobs sent to the printer via any of the plurality of connectivity paths;
receive, via the interface, a command for the computer to send a first print job to the printer;

monitor the plurality of paths to identify a set of available paths among the plurality of paths;

designate, from the set, a preferred available path according to preference data that considers projected timeliness rankings, security rankings, or reliability rankings for the available paths; and cause sending of the first print job from the queue to the printer via the preferred available path.

* * * * *